United States Patent
Atsmon et al.

(10) Patent No.: US 10,460,208 B1
(45) Date of Patent: Oct. 29, 2019

(54) SYSTEM AND METHOD FOR GENERATING LARGE SIMULATION DATA SETS FOR TESTING AN AUTONOMOUS DRIVER

(71) Applicant: Cognata Ltd., Rehovot (IL)

(72) Inventors: Dan Atsmon, Rehovot (IL); Eran Asa, Petach-Tikva (IL)

(73) Assignee: Cognata Ltd., Rehovot (IL)

( * ) Notice: Subject to any disclaimer, the term of this patent is extended or adjusted under 35 U.S.C. 154(b) by 0 days.

(21) Appl. No.: 16/237,806

(22) Filed: Jan. 2, 2019

(51) Int. Cl.
| | |
|---|---|
| G06K 9/62 | (2006.01) |
| G06N 3/08 | (2006.01) |
| G06T 7/55 | (2017.01) |
| G06T 3/00 | (2006.01) |
| G05D 1/02 | (2006.01) |
| G06K 9/00 | (2006.01) |

(52) U.S. Cl.
CPC ......... *G06K 9/6256* (2013.01); *G06K 9/6255* (2013.01); *G06K 9/6262* (2013.01); *G06N 3/08* (2013.01); *G06T 3/00* (2013.01); *G06T 7/55* (2017.01); *G05D 1/0221* (2013.01); *G05D 1/0231* (2013.01); *G06K 9/00791* (2013.01); *G06K 9/6267* (2013.01); *G06T 2207/10028* (2013.01); *G06T 2207/20081* (2013.01); *G06T 2207/20084* (2013.01); *G06T 2207/30248* (2013.01)

(58) Field of Classification Search
None
See application file for complete search history.

(56) References Cited

U.S. PATENT DOCUMENTS

| | | | | |
|---|---|---|---|---|
| 9,916,703 | B2 * | 3/2018 | Levinson | G01S 15/931 |
| 10,019,005 | B2 * | 7/2018 | Wang | G05D 1/0088 |
| 10,019,011 | B1 * | 7/2018 | Green | B60W 30/0956 |
| 10,031,526 | B1 * | 7/2018 | Li | G09B 9/05 |
| 2007/0088469 | A1 * | 4/2007 | Schmiedel | G05D 1/0274 |
| | | | | 701/23 |
| 2014/0309836 | A1 * | 10/2014 | Ollis | G08G 1/22 |
| | | | | 701/25 |
| 2016/0137206 | A1 * | 5/2016 | Chandraker | G06T 17/00 |
| | | | | 382/104 |
| 2016/0314224 | A1 * | 10/2016 | Wei | G06F 17/5009 |
| 2017/0123428 | A1 * | 5/2017 | Levinson | G05D 1/0214 |
| 2018/0032863 | A1 * | 2/2018 | Graepel | G06N 3/04 |
| 2018/0045519 | A1 * | 2/2018 | Ghadiok | G06F 16/5866 |
| 2018/0275658 | A1 * | 9/2018 | Iandola | G05D 1/0088 |
| 2018/0275667 | A1 * | 9/2018 | Liu | G05D 1/0221 |
| 2019/0039625 | A1 * | 2/2019 | Stefan | B60W 50/0205 |

* cited by examiner

*Primary Examiner* — Ryan P Potts

(57) ABSTRACT

A system for creating synthetic data for testing an autonomous system, comprising at least one hardware processor adapted to execute a code for: producing a plurality of synthetic training signals, each simulating one of a plurality of signals simultaneously captured from a common training scene by a plurality of sensors, and a plurality of training depth maps each qualifying one of the plurality of synthetic training signals according to the common training scene; training a machine learning model based on the plurality of synthetic training signals and the plurality of training depth maps; using the machine learning model to compute a plurality of computed depth maps based on a plurality of real signals, the plurality of real signals are captured simultaneously from a common physical scene, each of the plurality of real signals are captured by one of the plurality of sensors, each of the plurality of computed depth maps.

26 Claims, 8 Drawing Sheets

SYSTEM AND METHOD FOR GENERATING LARGE SIMULATION DATA SETS FOR TESTING AN AUTONOMOUS DRIVER

FIELD AND BACKGROUND OF THE INVENTION

The present invention, in some embodiments thereof, relates to a system for creating sensory data for testing an autonomous system, and, more specifically, but not exclusively, to creating sensory data for testing an advanced driver-assistance system (ADAS) or an autonomous driving system.

A vehicle comprising an ADAS may comprise one or more sensors, each capturing a signal providing input to the ADAS. There exist myriad conditions that may affect the signal captured by a sensor of the vehicle. For example, a first signal, captured by the sensor when mounted on the vehicle in a first position on the vehicle while the vehicle traverses a physical scene, for example a geographical area, may be different from a second signal, captured by the sensor when mounted on the vehicle in a second position on the vehicle while the vehicle traverses the physical scene. In addition, a physical characteristic of the sensor may affect the signal captured by the sensor. Some examples of a physical characteristic that may affect the captured signal are the sensor's sensitivity, the sensor's color intensity, the sensor's field of view, a material the sensor is made of, and the sensor's construction. There is a need to train, test, validate and verify an ADAS according to a target sensor.

SUMMARY OF THE INVENTION

It is an object of the present invention to provide a system and a method for creating synthetic data for a simulation.

The foregoing and other objects are achieved by the features of the independent claims. Further implementation forms are apparent from the dependent claims, the description and the figures.

According to a first aspect of the invention, a system for creating synthetic data for testing an autonomous system comprises at least one hardware processor adapted to execute a code for: producing a plurality of synthetic training signals, each simulating one of a plurality of signals simultaneously captured from a common training scene by a plurality of sensors, and a plurality of training depth maps each qualifying one of the plurality of synthetic training signals according to the common training scene; training a machine learning model based on the plurality of synthetic training signals and the plurality of training depth maps; using the machine learning model to compute a plurality of computed depth maps based on a plurality of real signals, the plurality of real signals are captured simultaneously from a common physical scene, each of the plurality of real signals are captured by one of the plurality of sensors, each of the plurality of computed depth maps qualifies one of the plurality of real signals; applying a point of view transformation to the plurality of real signals and the plurality of computed depth maps, to produce synthetic data simulating a possible signal captured from the common physical scene by a target sensor in an identified position relative to the plurality of sensors; and providing the synthetic data to at least one testing engine to test an autonomous system comprising the target sensor.

According to a second aspect of the invention, a method for creating synthetic data for testing an autonomous system comprises producing a plurality of synthetic training signals, each simulating one of a plurality of signals simultaneously captured from a common training scene by a plurality of sensors, and a plurality of training depth maps each qualifying one of the plurality of synthetic training signals according to the common training scene; training a machine learning model based on the plurality of synthetic training signals and the plurality of training depth maps; using the machine learning model to compute a plurality of computed depth maps based on a plurality of real signals, the plurality of real signals are captured simultaneously from a common physical scene, each of the plurality of real signals are captured by one of the plurality of sensors, each of the plurality of computed depth maps qualifies one of the plurality of real signals; applying a point of view transformation to the plurality of real signals and the plurality of computed depth maps, to produce synthetic data simulating a possible signal captured from the common physical scene by a target sensor in an identified position relative to the plurality of sensors; and providing the synthetic data to at least one testing engine to test an autonomous system comprising the target sensor.

According to a third aspect of the invention, a system for testing an autonomous system, comprising a target sensor comprises at least one hardware processor adapted to execute a code for: producing synthetic data simulating a possible signal captured from a common physical scene by the target sensor in an identified position relative to a plurality of sensors, where the synthetic data is produced using a plurality of real signals, the plurality of real signals are captured simultaneously from the common physical scene by the plurality of sensors; and testing the autonomous system using the synthetic data.

According to a fourth aspect of the invention, a system for detecting a plurality of objects in sensor data comprises at least one hardware processor adapted to execute a code for: producing a plurality of synthetic training signals, each simulating one of a plurality of signals simultaneously captured from a common training scene by a plurality of sensors, and a plurality of training depth maps each qualifying one of the plurality of synthetic training signals according to the common training scene; training a machine learning model based on the plurality of synthetic training signals and the plurality of training depth maps; using the machine learning model to compute a plurality of computed depth maps based on a plurality of real signals, the plurality of real signals are captured simultaneously from a common physical scene, each of the plurality of real signals are captured by one of the plurality of sensors, each of the plurality of computed depth maps qualifies one of the plurality of real signals; and providing the plurality of computed depth maps to at least one object classification engine to detect at least one object in the plurality of real signals.

With reference to the first and second aspects, in a first possible implementation of the first and second aspects of the present invention, the at least one hardware processor is adapted to further execute code for: applying a style transformation to the synthetic data according to real target sensor data captured by the target sensor from an other physical scene, to produce target synthetic data simulating target data captured by the target sensor; and using the target synthetic data as the synthetic data. Optionally, the at least one hardware processor is adapted to further execute code for: applying a geometric distortion transformation to the synthetic data according to at least one physical characteristic of the target sensor, to produce adjusted target synthetic data simulating target data captured by the target sensor; and using the adjusted target synthetic data as the synthetic data. Optionally, the geometric distortion transformation is selected from a group of geometric distortion transformations comprising: a fisheye transform, a barrel distortion transform, a pincushion distortion transform, and a moustache distortion transform. Applying a style transformation and additionally or alternatively applying a geometric distortion transformation to the synthetic data increases accuracy of the synthetic data and thus increases accuracy of an output of a testing engine using the synthetic data.

With reference to the first and second aspects, in a second possible implementation of the first and second aspects of the present invention, the plurality of sensors are a plurality of cameras; the target sensor is a target camera; each of the plurality of real signals comprises a plurality of digital images captured from the common physical scene by respective camera of the plurality of cameras; and each of the plurality of computed depth maps comprises a plurality of depth images, each comprising depth information for a digital image of respective plurality of digital images qualified by the computed depth map. Optionally, each depth image of the plurality of depth images comprises depth information for each of a plurality of pixels of respective digital image. Optionally, the synthetic data comprises a plurality of synthetic digital images, and the at least one hardware processor is adapted to further execute code for: applying a hole-filling algorithm to the plurality of synthetic images of the synthetic data to produce filled target synthetic data simulating target data captured by the target sensor; and using the filled target synthetic data as the synthetic data. Applying a hole-filling algorithm to the plurality of synthetic images, of the synthetic data, increases accuracy of the synthetic data and thus increases accuracy of an output of a testing engine using the synthetic data.

With reference to the first and second aspects, in a third possible implementation of the first and second aspects of the present invention, the at least one hardware processor is adapted to further execute code for: applying another style transformation to the plurality of synthetic training signals and to the real target sensor data to produce a plurality of transformed synthetic training signals; and using the plurality of transformed synthetic training signals when training the machine learning model. Training the machine learning model using the plurality of transformed synthetic training signals produced by applying the other style transformation to the plurality of synthetic training signals and to the real target sensor data improves accuracy of an output of the machine learning model. Optionally, training the machine learning model comprises: in each of a plurality of self-supervised training iterations: using the machine learning model to produce a plurality of test depth maps based on at least some of the plurality of real sensor signals; using at least one of the plurality of real sensor signals and at least some of the plurality of test depth maps to generate at least one reconstructed sensor signal associated with at least one first sensor of the plurality of sensors, where the at least one of the plurality of real sensor signals is associated with a second sensor of the plurality of sensors; and modifying at least one model value of the machine learning model to minimize a difference between the at least one reconstructed sensor signal and at least one other real sensor signal associated with the at least one first sensor. Self-supervised training of the machine learning model using at least some of the plurality of real sensor improves accuracy of an output of the machine learning model. Optionally, the machine learning model is a neural network.

With reference to the first and second aspects, in a fourth possible implementation of the first and second aspects of the present invention, at least one first physical quality value of at least one physical quality, measured while capturing the plurality of real signals by the plurality of sensors, is greater than at least one second physical quality value of the at least one physical quality, measured while capturing the real target sensor data by the target sensor. Optionally, the at least one first physical quality value comprises a first value of a first distance the plurality of sensors traversed in the common physical scene while capturing the plurality of real signals; and the at least one second physical quality value comprises a second distance value of a second distance the target sensor traversed in the other physical scene while capturing the real target sensor data. Using real target sensor data captured over a second distance shorter than a first distance over which the plurality of real signals are captured reduces a cost of producing target synthetic data simulating target data captured by the target sensor over the first distance. Optionally, a ratio between the first distance value and the second distance value is greater than an identified ratio threshold. Optionally, the identified ratio threshold is selected from a group of ratio thresholds comprising 10, 100 and 1000.

With reference to the first and second aspects, in a fifth possible implementation of the first and second aspects of the present invention, the plurality of real signals are captured while the plurality of sensors are mounted on a vehicle in an identified pattern, the real target sensor data is captured while the target sensor is mounted on the vehicle at the identified position, and the identified position is an identified relative position relative to the identified pattern. Optionally, the identified pattern is a grid. Using a two-dimensional or three-dimensional pattern increases an amount of possible positions of the target sensor for which interpolation may be used to compute the point of view transformation compared to using a one dimensional pattern, thus increasing accuracy of the synthetic data for more possible positions than when using a one dimensional pattern.

With reference to the first and second aspects, in a sixth possible implementation of the first and second aspects of the present invention, the at least one hardware processor is adapted to further execute code for: applying a new point of view transformation to the plurality of real signals and the plurality of computed depth maps, to produce new synthetic data simulating a new possible signal captured from the common physical scene by a new target sensor in a new identified position relative to the plurality of sensors; and providing the new synthetic data to the at least one testing engine to test an other autonomous system comprising the new target sensor. Optionally, the at least one hardware processor is adapted to further execute code for: applying a new style transformation to the new synthetic data according to new real target sensor data captured by the new target sensor from a new other physical scene, to produce new target synthetic data simulating new target data captured by the new target sensor; and using the new target synthetic data as the new synthetic data. Optionally, the at least one hardware processor is adapted to further execute code for: applying a new geometric distortion transformation to the new synthetic data according to at least one new physical characteristic of the new target sensor, to produce new adjusted target synthetic data simulating new target data captured by the new target sensor; and using the new adjusted target synthetic data as the new synthetic data. Optionally, the new geometric distortion transformation is selected from the group of geometric distortion transformations. Optionally, the new synthetic data comprises a new plurality of synthetic digital images, and the at least one hardware processor is adapted to further execute code for: applying a new hole-filling algorithm to the new plurality of synthetic images of the new synthetic data to produce new filled target synthetic data simulating new target data captured by the new target sensor; and using the new filled target synthetic data as the new synthetic data. Using the plurality of computed depth maps to produce new synthetic data simulating new target data captured by the new target sensor reduces costs of testing another autonomous system comprising the new target sensor. Optionally, the at least one hardware processor is adapted to further execute code for: applying a new other style transformation to the plurality of synthetic training signals and to the new real target sensor data to produce a new plurality of transformed synthetic training signals; and using the new plurality of transformed synthetic training signals when training the machine learning model. Training the machine learning model according to a new target sensor increases accuracy of the plurality of computed depth maps and thus improves accuracy of the new synthetic data.

With reference to the first and second aspects, in a seventh possible implementation of the first and second aspects of the present invention, the autonomous system is selected from a group of autonomous systems consisting of: an autonomous driving system, and an advanced driver-assistance system (ADAS).

With reference to the third aspect, in a first possible implementation of the third aspect of the present invention, producing the synthetic data using the plurality of real signals comprises: producing a plurality of synthetic training signals, each simulating one of a plurality of signals simultaneously captured from a common training scene by the plurality of sensors, and a plurality of training depth maps each qualifying one of the plurality of synthetic training signals according to the common training scene; training a machine learning model based on the plurality of synthetic training signals and the plurality of training depth maps; using the machine learning model to compute a plurality of computed depth maps based on the plurality of real signals, the plurality of real signals are captured simultaneously from the common physical scene, each of the plurality of real signals are captured by one of the plurality of sensors, each of the plurality of computed depth maps qualifies one of the plurality of real signals; applying a point of view transformation to the plurality of real signals and the plurality of computed depth maps, to produce synthetic data simulating the possible signal captured from the common physical scene by the target sensor in an identified position relative to the plurality of sensors; and providing the synthetic data to at least one testing engine to test the autonomous system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
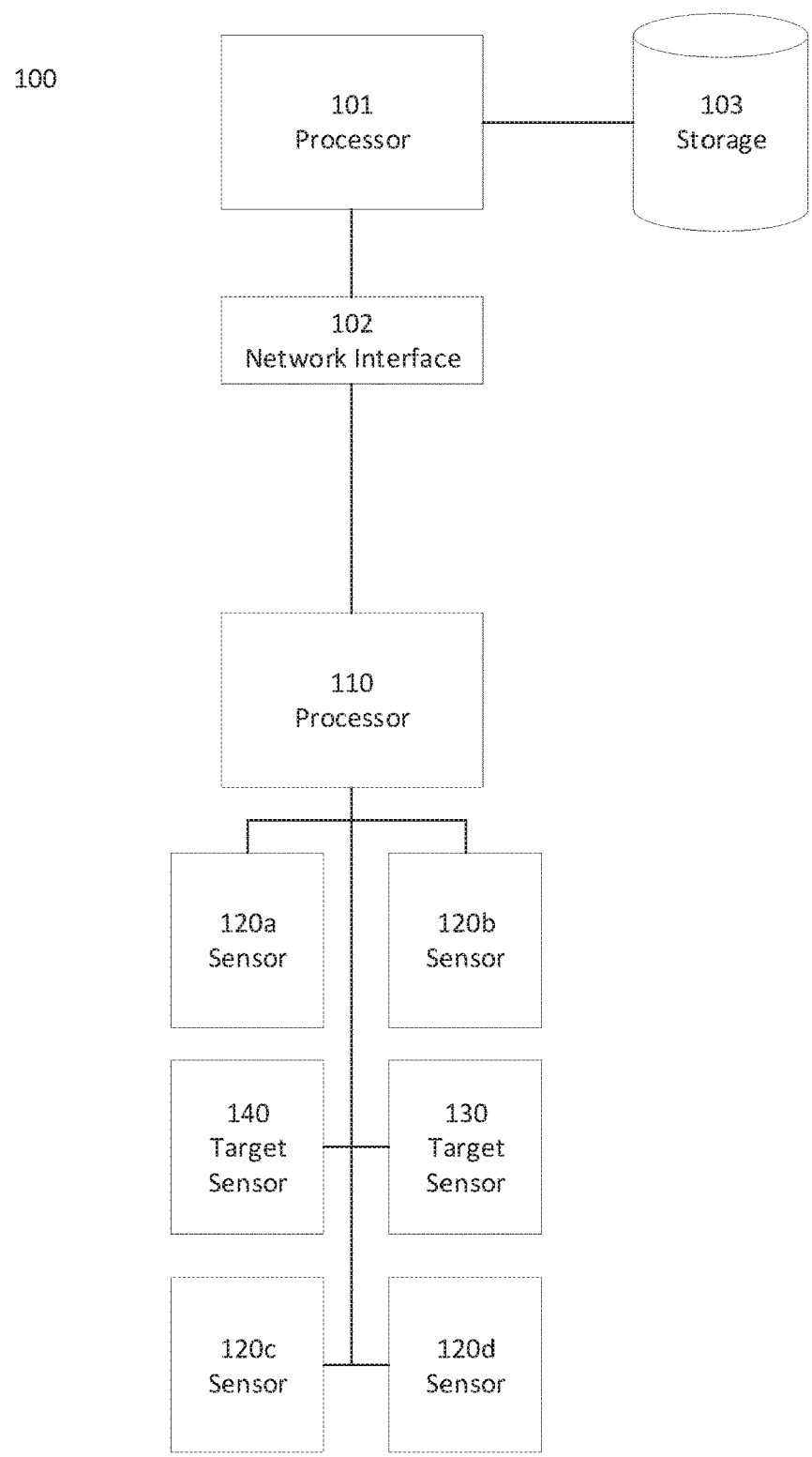
FIG. 1 is a schematic block diagram of an exemplary system for creating synthetic data for testing an autonomous system, according to some embodiments of the present invention.

The present invention, in some embodiments thereof, relates to a system for creating sensory data for testing an autonomous system, and, more specifically, but not exclusively, to creating sensory data for testing an ADAS or an autonomous driving system.

The following description focuses on a non-limiting example of a system for testing an autonomous system, however synthetic data created according to the present invention may be used in a similar manner to alternatively or additionally verify the autonomous system, alternatively or additionally train the autonomous system and alternatively or additionally validate the autonomous system. As used herein, the term "testing engine" refers to an engine for performing one or more operations on an autonomous system, where the one or more operations are selected from a group of: testing the autonomous system, validating the autonomous system, verifying the autonomous system and training the autonomous system.

In addition, the following description focuses on a system for testing an ADAS, however the present invention is not limited to the field of automotive autonomous systems and may be used with an autonomous system from another field, for example an autonomous production process control system.

Some methods for testing an ADAS comprising a target sensor comprise capturing real testing data by the target sensor, mounted at a target position on a vehicle, while traversing the physical scene. Such methods require capturing new real testing data any time some of the sensor's physical characteristics are modified or when the sensor is mounted in a new position on the vehicle. For example, changing a hardware component of the sensor may change some of the sensor's physical characteristics such as its sensitivity to light, its color intensity and distortion of a signal captured by the sensor. Capturing the real testing data may be expensive, for example due to a physical quality measured while capturing the real testing data such as an amount of time required to capture the real testing data or a distance a vehicle is required to traverse to capture the real testing data. In addition, there may be a need to produce large data sets of testing data, further increasing a cost of capturing the real testing data, for example due to an increased amount of time to capture the real testing data or an increased distance over which the real testing data is captured.

As used henceforth, the term "synthetic data" means data generated by a computerized generation system and not captured by a sensor.

Using synthetic data to test the ADAS is an alternative to using the real testing data captured by the sensor. However there is a need to produce synthetic testing data that exhibits characteristics according to the target sensor. For example, for visual data, there is a need to produce synthetic data according to the target sensor's position on the vehicle and according to the target sensor's sensitivity. There exist methods of producing synthetic data simulating a possible signal captured from a common physical scene by applying a point of view transformation to two or more signals captured by two or more sensors from the common physical scene. For example, there exist methods of computing a point of view transformation applied to two or more signals, each comprising a plurality of captured digital images captured by one of two or more image sensors, to produce a plurality of synthetic digital images simulating a possible signal captured by a target image sensor. Such methods may compute an interpolation or an extrapolation of the two or more signals according to a relation between a target position on the vehicle of the target image sensor and two or more known positions on the vehicle of the two or more image sensors. However, the plurality of synthetic digital images produced by such methods may be distorted compared to the possible signal, as the accuracy of the plurality of synthetic digital images is impacted by availability and quality of depth maps qualifying the plurality of images of the two or more signals. Some existing sensors do not always capture depth information correlated with a captured signal. Some other existing sensors provide low quality depth maps, qualifying only some of a plurality of pixels of each of the plurality of digital images of a signal. In addition, there is a need to align the two or more signals. There is a need to reduce the distortion of the plurality of synthetic digital images compared to the possible signal captured by a target image sensor.

The present invention proposes, in some embodiments thereof, capturing a plurality of signals simultaneously from a common training scene by a plurality of sensors and generating a plurality of computed depth maps based on the plurality of real signals, each computed depth map qualifying one of the plurality of real signals, and applying a point of view transformation to the plurality of real signals and the plurality of computed depth maps to produce synthetic data simulating a possible signal captured from the common physical scene by a target sensor in an identified position relative to the plurality of sensors.

Using a plurality of real signals captured simultaneously increases an alignment among the plurality of real signals and increases an accuracy of the synthetic data such that a distortion of the synthetic data with relation to the plurality of real signals is reduced compared to using some existing methods. In some embodiments of the present invention each of the plurality of real signals comprises a plurality of digital images, and each of the plurality of computed depth maps is a dense computed depth map, comprising depth information for each of a plurality of pixels of the plurality of digital images of the respective real signal qualified by the computed depth map. Using dense computed depth maps when applying the point of view transformation improves the accuracy of the synthetic data and thus ultimately improves accuracy of an output of a testing engine using data produced based on the synthetic data. Using interpolation to compute the point of view transformation produces a more accurate point of view transformation than using extrapolation to compute the point of view transformation. According to the present invention, in some embodiments the plurality of sensors is organized in an identified pattern, for example a two-dimensional pattern, for example a grid. Using a two-dimensional pattern increases an amount of possible positions of the target sensor for which interpolation may be used to compute the point of view transformation compared to using a one dimensional pattern, thus increasing accuracy of the synthetic data for more possible positions than when using a one dimensional pattern. Optionally, the identified pattern is three-dimensional.

The present invention further proposes, in some embodiments, applying a style transformation to the synthetic data according to real target sensor data captured by the target sensor from an other physical scene, to produce target synthetic data simulating target data captured by the target sensor, and using the target synthetic data as the synthetic data in further processing. Applying a style transformation to the synthetic data according to real target sensor data captured by the target sensor increases accuracy of the synthetic data, and thus increases accuracy of an output of a testing engine using the synthetic data.

The present invention further proposes, in some embodiments, applying a geometric distortion transformation to the synthetic data according to at least one physical characteristic of the target sensor, to produce adjusted target synthetic data simulating target data captured by the target sensor, and using the adjusted target synthetic data as the synthetic data in further processing. Some more examples of a physical characteristic of a sensor are a lens distortion and a lens field of view. Applying a geometric distortion transformation to the synthetic data according to at least one physical characteristic of the target sensor increases accuracy of the synthetic data, and thus improves accuracy of an output of a testing engine using the synthetic data.

In addition, in some embodiments the present invention further proposes producing the plurality of computed depth maps using a machine learning model trained based on a plurality of synthetic training signals, each simulating one of a plurality of signals captured by the plurality of sensors from a common training scene, and a plurality of training depth maps, each qualifying one of the plurality of synthetic training signals according to the common training scene such that the training depth map provides ground truth for the respective synthetic training signal. Using a plurality of synthetic training signals simulating a plurality of signals captured by the plurality of sensors increases an accuracy of an output of the machine learning model in response to the plurality of real signals captured by the plurality of sensors, compared to an alternative output in response to the plurality of signals captured by the plurality of sensors when the machine learning model is trained using an alternative plurality of synthetic training signals that do not simulate the plurality of signals captured by the plurality of sensors. Increasing the accuracy of the output of the machine learning model increases an accuracy of the synthetic data and thus increases accuracy of an output of a testing engine using the synthetic data. In some embodiments, the present invention further proposes applying another style transformation to the plurality of synthetic training signals according to the real target sensor data and training the machine learning model using a plurality of transformed synthetic training signals produced by applying the other style transformation. Training the machine learning model using signals transformed according to the real target sensor data improves the accuracy of an output of the machine learning model in response to the plurality of real signals, thus improving the accuracy of the synthetic data, and thus improves accuracy of an output of a testing engine using the synthetic data.

As used herein, the term self-supervised learning refers to implicitly and autonomously extracting correlations, embedded metadata, or domain knowledge available within the input to a machine learning model and using this extracted data as supervisory signals in training the machine learning model, without a need to explicitly label the input data. The present invention proposes, in some embodiments, to further use self-supervised learning when training the machine learning model. In such embodiments, a plurality of test depth maps produced by the machine learning model based on at least some of the plurality of real sensor signals are used with at least one of the plurality of real sensor signals to generate at least one reconstructed sensor signal associated with at least one sensor of the plurality of sensors. In such embodiments the at least one of the plurality of real sensors is associated with a second sensor of the plurality of sensors. According to the present invention, in such embodiments a difference between the at least one reconstructed sensor signal and at least one other real sensor signal associated with the at least one first sensor is used as a supervisory signal to the machine learning model such that at least one model value of the machine learning model is modified to minimize the difference. Using self-supervised learning when training the machine learning model improves accuracy of the plurality of computed depth maps, which in turn improves the accuracy of the synthetic data.

There may be a need to produce testing data for testing an autonomous system for more than one sensor. Costs of producing the testing data for the more than one sensor is impacted by a cost of producing the testing data for each of the more than one sensor. For example, when the testing data comprises real new testing data captured for each of the more than one sensors, costs of producing the testing data may be impacted by an amount of time to capture the new real new testing data or a distance over which the real new testing data is captured. The present invention, in some embodiments thereof, proposes using the plurality of real signals and the plurality of computed depth maps to produce more testing data for more than one target sensor. In such embodiments, the present invention proposes applying a new point of view transformation to the plurality of real signals and the plurality of computed depth maps to produce new synthetic data simulating a new possible signal captured from the common physical scene by a new target sensor in a new identified position relative to the plurality of sensors, and optionally applying a new style transformation according to new real target sensor data captured by the new target sensor from a new physical scene, to produce new synthetic data simulating new target data captured by the new target sensor. The present invention further proposes, in some embodiments, applying a new geometric distortion transformation to the new synthetic data according to at least one new physical characteristic of the new target sensor, to produce new adjusted target synthetic data simulating the new target data, and using the adjusted target synthetic data as the new synthetic data in further processing. Using the plurality of real signals and the plurality of computed depth maps to produce new synthetic data for a new target sensor reduces overall costs of producing a plurality of synthetic data sets simulating data captured by the more than one sensor.

In addition, in some embodiments thereof, the present invention proposes using real target sensor data such that a first physical quality value of a physical quality measured when capturing the plurality of real signals is different from a second physical quality value of the physical quality measured when capturing the real target sensor data. For example, a first distance that a vehicle traverses in the common physical scene when the plurality of real signals are captured may be greater than a second distance another vehicle traverses the other physical scene when capturing the real target sensor signal is captured. In another example, a first atmospheric pressure value measured when capturing the plurality of real signals may be greater than a second atmospheric pressure value when capturing the real target sensor data. The difference between the first physical quality value and the second physical quality value facilitates reducing costs of capturing the real target sensor data, for example reducing cost of traversing a long distance or reducing cost of producing a high atmospheric pressure, which in turn reduces a cost of producing the synthetic data compared to a cost of capturing real target sensor data such that the second physical quality value is equivalent to the first physical quality value. In addition, a cost of producing the new synthetic data according to the present invention is lower than a cost of capturing equivalent target sensor data by the target sensor such that an equivalent physical quality value measured when capturing the target sensor data is equivalent to the first physical quality value.

In addition, in some embodiments, the present invention proposes using the synthetic data generated according to the present invention to test an autonomous system comprising the target sensor. Using synthetic data generated according to the present invention reduces cost of testing an autonomous system comprising the target sensor and increases accuracy of an output of a system for testing the autonomous system compared to testing the autonomous system with the real target sensor data.

There exist other uses of dense depth maps besides producing simulation data for a testing engine. In some embodiments the present invention proposes using the plurality of computed depth maps when detecting, and additionally or alternatively classifying, one or more objects in the plurality of signals. In such embodiments, the present invention proposes providing the plurality of computed depth maps to one or more object classification engines to detect, and additionally or alternatively classify, one or more objects in the plurality of signals. An output of an object classification engine using the plurality of computed depth maps produced according to the present invention is more accurate than another output when using other depth maps of lesser quality.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For brevity, the term "processor" is used to mean "at least one hardware processor". The processor may be any kind of programmable or non-programmable circuitry that is configured to carry out the operations described below.

Reference is now made to FIG. 1, showing a schematic block diagram of an exemplary system 100 for creating synthetic data for testing an autonomous system, according to some embodiments of the present invention. In such embodiments, system 100 comprises processor 101. Optionally, processor 101 is connected to at least one digital communication network interface 102, optionally for receiving a plurality of real signals. Optionally, the plurality of real signals are captured by a plurality of sensors, for example sensor 120a, sensor 120b, sensor 120c and sensor 120d. Optionally the plurality of sensors comprises fewer than 4 sensors. Optionally the plurality of sensors comprises more than 4 sensors. Optionally, the plurality of sensors is arranged in an identified pattern. The identified pattern may be a two-dimensional pattern, for example a grid. Optionally, the pattern is a three dimensional pattern. Optionally, the identified pattern is symmetrical. Some examples of a sensor are an image sensor, such as a camera, an acceleration sensor, a velocity sensor, an audio sensor, a radar, a light detection and ranging (LIDAR) sensor, an ultrasonic sensor, a thermal sensor, and a far infra-red (FIR) sensor. A camera may capture visible light frequencies. A camera may capture invisible light frequencies such as infra-red light frequencies and ultra-violet light frequencies. Optionally, the plurality of real signals are stored in a database. Optionally processor 101 retrieves the plurality of real signals from the database. Optionally, at least one digital communication network interface 102 is connected to a local area network, for example an Ethernet network or a wireless network. Optionally, at least one digital communication network interface 102 is connected to a wide area network, for example the Internet. Optionally, processor 101 receives the plurality of real signals from an other processor 110. Optionally other processor 110 is connected to the plurality of sensors comprising sensor 120a, sensor 120b, sensor 120c and sensor 120d. Optionally, system 100 comprises target sensor 130, optionally connected to other processor 110. Optionally target sensor 130 is a camera. Optionally, target sensor 130 is selected from a group of sensors comprising: an image sensor, such as a camera, an acceleration sensor, a velocity sensor, an audio sensor, a radar, a light detection and ranging (LIDAR) sensor, an ultrasonic sensor, a thermal sensor, and a far infra-red (FIR) sensor. Optionally, system 100 comprises a new target sensor 140, optionally connected to other processor 110. Optionally, target sensor 140 is selected from the group of sensors. Optionally, sensor 140 is a camera. Optionally, the plurality of sensors comprising sensor 120a, sensor 120b, sensor 120c and sensor 120d and additionally or alternatively target sensor 130 and additionally or alternatively new target sensor 140 are connected to processor 101. Optionally, processor 101 is connected to at least one digital storage 103. Some examples of a digital storage are a hard disk drive, a network-connected storage and a storage network. Optionally, processor 101 reads the plurality of real signals from at least one digital storage 103, optionally from a database stored on at least one digital storage 103. Optionally, the plurality of sensors comprising sensor 120a, sensor 120b, sensor 120c and sensor 120d are mounted on a vehicle while capturing the plurality of real signals while traversing a common physical scene, for example a geographical area. Optionally, target sensor 130 is mounted on the vehicle while capturing real target sensor data. Optionally, target sensor 130 is mounted on the vehicle in an identified position relative to the plurality of sensors. For example the identified position may be at least one identified sensor distance and at least one orientation in relation to at least one of the plurality of sensors. Optionally, the identified pattern of the plurality of sensors and the target sensor's identified position are relative to a horizontal axis and a vertical axis. Optionally, a horizontal component of the identified position is between at least two horizontal components of at least two first positions of at least two first sensors of the plurality of sensors relative to the horizontal axis. Optionally, a vertical component of the identified position is between at least two vertical components of at least two second positions of at least two second sensors of the plurality of sensors relative to the vertical axis. Optionally, target sensor 130 is mounted on an other vehicle in the identified position relative to the plurality of sensors. Optionally, new target sensor 140 is mounted on the vehicle while capturing new real target sensor data. Optionally, target sensor 140 is mounted on the vehicle in a new identified position relative to the plurality of sensors. For example the new identified position may be at least one new identified sensor distance and at least one new orientation in relation to at least one of the plurality of sensors. Optionally, target sensor 140 is mounted on the other vehicle in the new identified position relative to the plurality of sensors.

Figure 2:
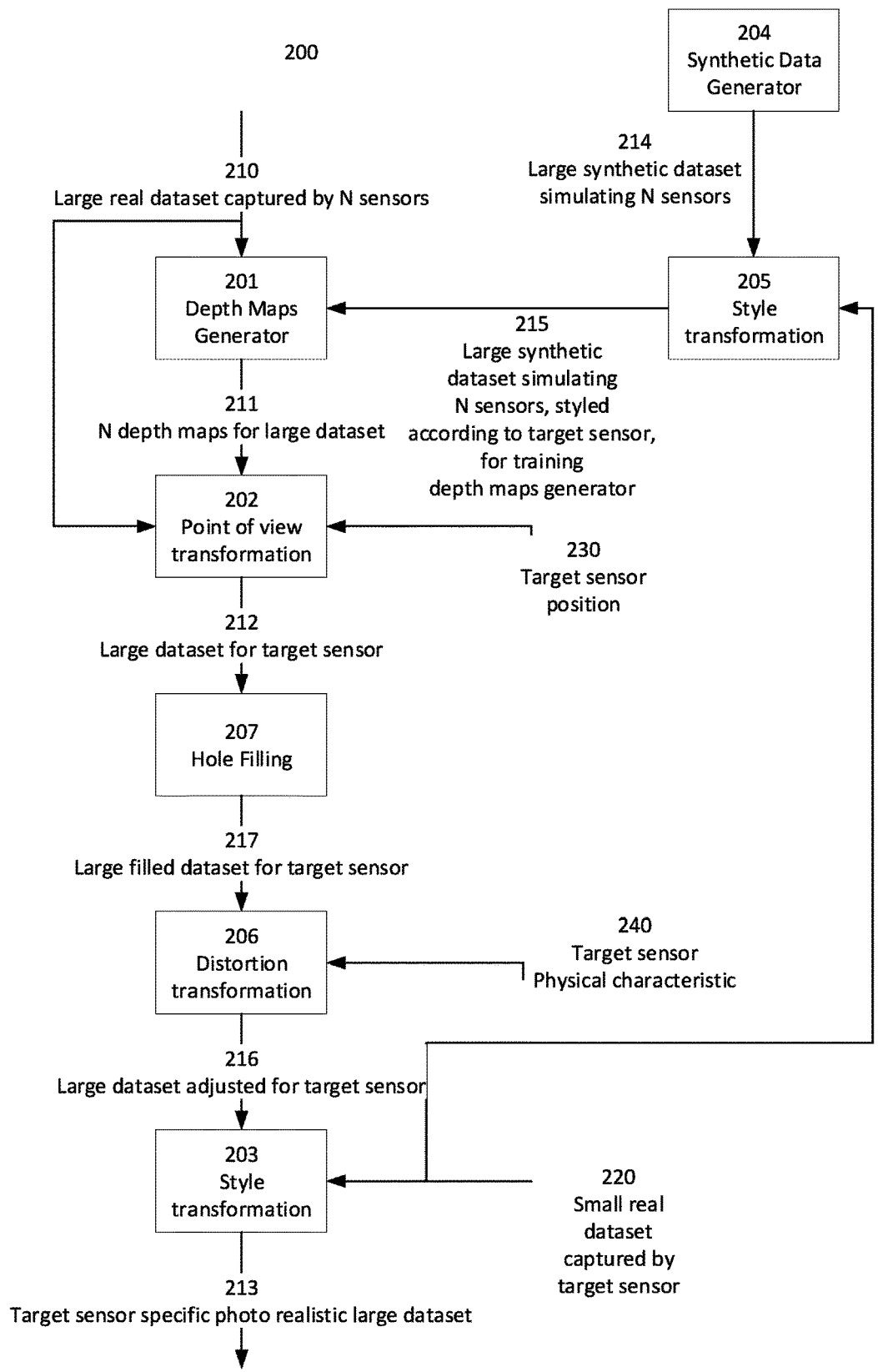
FIG. 2 is a schematic block diagram of an exemplary flow of data for creating synthetic data for testing an autonomous system, according to some embodiments of the present invention.

Before describing a possible method for creating synthetic data, reference is now made also to FIG. 2, showing a schematic block diagram of an exemplary flow of data for creating synthetic data for testing an autonomous system, according to some embodiments of the present invention. In such embodiments, input data to system 100 comprises a large real dataset 210 captured by the plurality of sensors, for example sensor 120a, sensor 120b, sensor 120c and sensor 120d, and a small real dataset 220 captured by target sensor 130. The terms large and small refer to one or more physical quality values of at least one physical quality measured when capturing the large real dataset and the small real dataset, indicative of a cost or difficulty of capturing the large real dataset and the small real dataset, respectively. For example, when the at least one physical quality comprises a distance traversed by a vehicle while capturing a dataset, a first distance traversed by the vehicle while capturing the large dataset may be greater than a second distance captured by the vehicle while capturing the small dataset. The present invention, in some embodiments, proposes producing a large synthetic dataset simulating a large target dataset captured by the target sensor, using the large real dataset captured by the plurality of sensors and the small real dataset captured by the target sensor. To do so, a depth maps generator 201 optionally produces a plurality of depth maps 211 for the large real dataset 210. Optionally, a point of view transformation 202 is applied to the large real dataset 210 and to the plurality of depth maps 211 according to target sensor position 230. Optionally, a result of point of view transformation 202 is a large synthetic target dataset 212 simulating a large real target dataset captured by the target sensor. The large synthetic target dataset may be provided to a testing engine to test an autonomous system comprising the target sensor. As used herein, a hole in a digital image is a pixel of the digital image having no color value or a black color value indicating a failure to assign the pixel another color value. When the large synthetic target dataset comprises a plurality of digital images, some of the plurality of images may each have at least one hole. To improve accuracy of synthetic data provided to the testing engine, optionally a hole-filling algorithm 207 is applied to the large synthetic target dataset 212 to remove at least some of the at least one hole of some of the plurality of images. Optionally, a result of applying the hole-filling algorithm is a large synthetic filled target dataset 217. Optionally, the large synthetic filled target dataset 217 is provided to the testing engine to test the autonomous system. Optionally a distortion transformation 206 is applied to the large synthetic filled target dataset 217 according to at least one target sensor characteristic 240. Some examples of a distortion transformation according to at least one target sensor characteristic is a fisheye transform, a barrel distortion transform, a pincushion distortion transform and a moustache distortion transform. Optionally, a result of applying the distortion transformation is a large synthetic adjusted target dataset 216, adjusted according to the at least one target sensor characteristic 240. Optionally, the large synthetic adjusted target dataset 216 is provided to the testing engine to test the autonomous system. Optionally, a style transformation 203 is applied to the large synthetic adjusted target dataset 216 according to a small real dataset 220 captured by the target sensor, to further improve accuracy of synthetic data provided to the testing engine. Optionally, a result of applying the style transformation is a target sensor specific photo realistic large synthetic dataset 213, which may be provided to the testing engine. Alternatively, style transformation 203 may be applied to large synthetic target dataset 212 according to small real dataset 220 to produce the target sensor specific photo realistic large synthetic dataset.

Optionally, depth maps generator 201 is a machine learning model, for example a neural network. Optionally, a synthetic data generator 204 generates a large synthetic training dataset 214 simulating a large real training dataset captured by the plurality of sensors, and optionally depth maps generator 201 is trained using large synthetic training dataset 214. Optionally, an other style transformation 205 is applied to large synthetic training dataset 214 according to small real dataset 220 captured by the target sensor. Optionally, an output of the other style transformation is a large synthetic target specific training dataset 215. Optionally, depth maps generator 201 is trained using large synthetic target specific training dataset 215.

In some embodiments of the present invention, system 100 implements the following optional method to produce synthetic data for testing an autonomous system according to flow of data 200.

Figure 3:
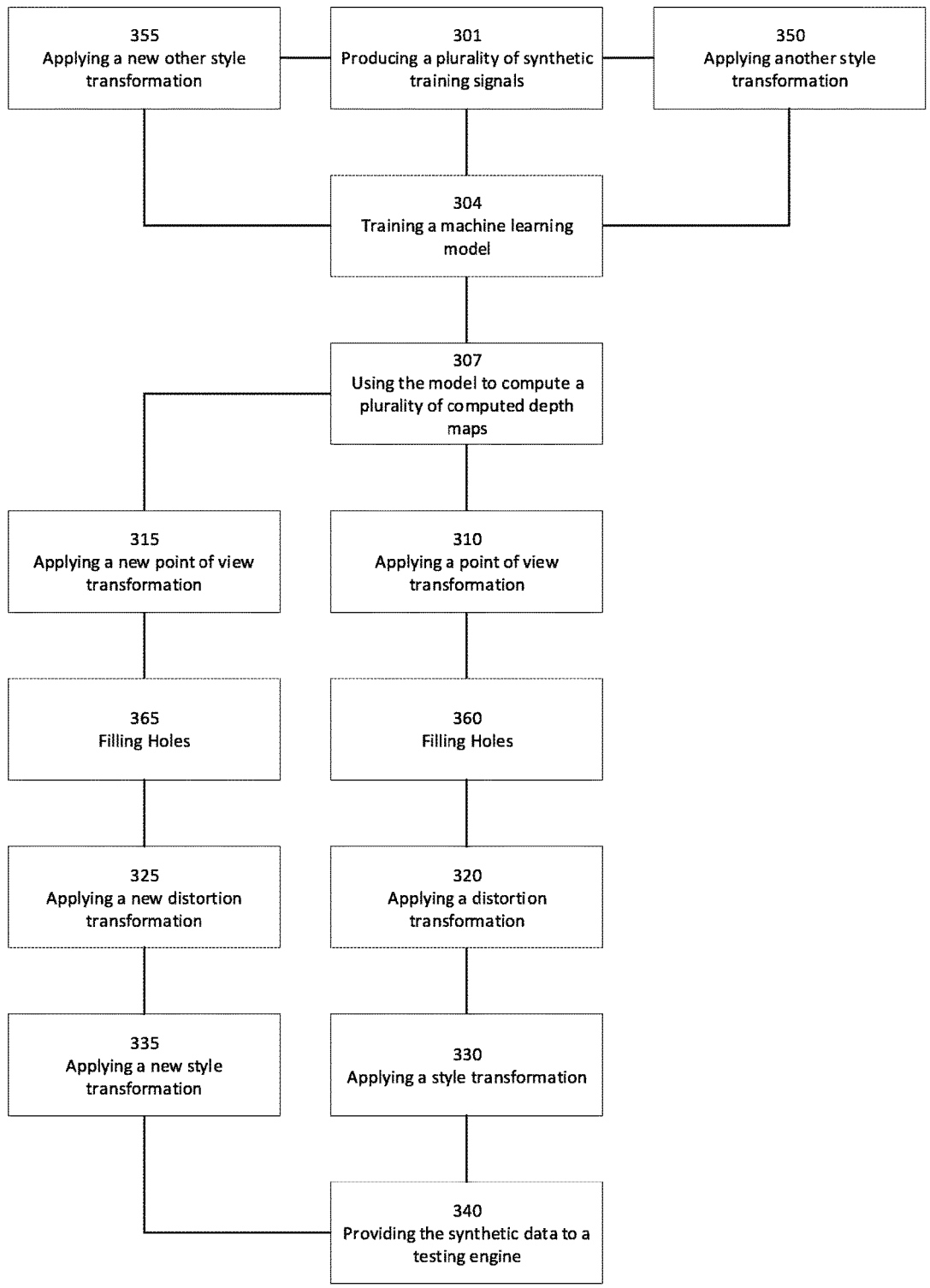
FIG. 3 is a flowchart schematically representing an optional flow of operations for creating synthetic data for testing an autonomous system, according to some embodiments of the present invention.

Reference is now made also to FIG. 3, showing a flowchart schematically representing an optional flow of operations 300 for creating synthetic data for testing an autonomous system, according to some embodiments of the present invention. In such embodiments, processor 101 produces in 301 a plurality of synthetic training signals, for example large synthetic training dataset 214, such that each of the plurality of synthetic training signals simulates one of a plurality of signals simultaneously captured from a common training scene by a plurality of sensors comprising sensor

120a, sensor 120b, sensor 120c and sensor 120d. In addition, in such embodiments, processor 101 produces in 301 a plurality of training depth maps, each qualifying one of the plurality of synthetic training signals according to the common training scene such that each training depth map provides ground truth for the respective synthetic training signal. Optionally, the ground truth provided for the respective synthetic training signal comprises semantic segmentation of the respective signal and additionally or alternatively one or more three-dimensional bounding boxes for the respective training signal. The common training scene may be a training geographical area. In 304, processor 101 optionally trains a machine learning model based on the plurality of synthetic training signals and the plurality of training depth maps. Optionally, the machine learning model is a neural network. In 307, processor 101 optionally uses the machine learning model to compute a plurality of computed depth maps, for example plurality of depth maps 211, based on a plurality of real signals. Optionally, the plurality of real signals are captured simultaneously from a common physical scene such that each of the plurality of real signals is captured by one of the plurality of sensors comprising sensor 120a, sensor 120b, sensor 120c and sensor 120d. The common physical scene may be a geographical area. Optionally, each of the plurality of real signals comprises a plurality of digital images captured from the common physical scene by respective sensor, for example when the respective sensor is a camera. Optionally, each of the plurality of depth maps qualifies one of the plurality of real signals. Optionally, each of the plurality of computed depth maps comprises a plurality of depth images, each comprising depth information for a digital image of respective plurality of digital images qualified by the computed depth map. Optionally, each depth map of the plurality of depth images comprises depth information for each of a plurality of pixels of respective digital image.

In 310, processor 101 optionally applies a point of view transformation to the plurality of real signals and the plurality of computed depth maps, to produce synthetic data, for example large synthetic target dataset 212, simulating a possible signal captured from the common physical scene by target sensor 130 in an identified position relative to the plurality of sensors, and in 340 processor 101 optionally provides the synthetic data to at least one testing engine to test an autonomous system comprising the target sensor. Optionally, the testing engine additionally or alternatively performs one or more operations on the autonomous system, where the one or more operations are selected from a group of: validating the autonomous system, verifying the autonomous system and training the autonomous system. Optionally, the autonomous system is an autonomous driving system. Optionally, the autonomous system is an ADAS. Optionally, the autonomous system is a production process control system.

Optionally, the synthetic data comprises a plurality of digital images, for example when the plurality of sensors is a plurality of cameras. Optionally, in 360 processor 101 applies a hole-filling algorithm to the plurality of digital images of the synthetic data, to produce filled target synthetic data, for example large synthetic filled target dataset 217, simulating target data captured by target sensor 130, and optionally uses the filled target synthetic data as the synthetic data, for example providing the filled target synthetic data to the at least one testing engine. Optionally, processor 101 applies the hole-filling algorithm by executing at least one prediction engine to predict at least one color of at least one pixel of at least one of the plurality of digital images of the synthetic data. Optionally, the at least one prediction engine is at least one color prediction machine learning model.

Optionally, in 320 processor 101 applies a geometric distortion transformation to the synthetic data according to at least one physical characteristic of target sensor 130, to produce adjusted target synthetic data, for example large synthetic adjusted target dataset 216, simulating target data captured by target sensor 130 and optionally uses the adjusted target synthetic data as the synthetic data, for example providing the adjusted target synthetic data to the at least one testing engine. Some examples of a geometric distortion transformation according to at least one physical characteristic of a sensor are a fisheye transform, a barrel distortion transform, a pincushion distortion transform and a moustache distortion transform. Optionally, processor 101 uses the filled target synthetic data produced in 360 as the synthetic data in 320.

Optionally, processor 101 applies in 330 a style transformation to the synthetic data according to real target sensor data, for example small real dataset 220, captured by target sensor 130 from an other physical scene, to produce target synthetic data, for example target sensor specific photo realistic large synthetic dataset 213, simulating target data captured by target sensor 130 and optionally uses the target synthetic data as the synthetic data, for example providing the target synthetic data to the at least one testing engine. The other physical scene may be an other geographical area. Optionally, processor 101 uses the adjusted target synthetic data produced in 320 as the synthetic data in 330. Optionally, processor 101 uses the filled target synthetic data produced in 360 as the synthetic data in 330.

Optionally, at least one first physical quality value of at least one physical quality, measured while capturing the plurality of real signals by the plurality of sensors, is greater than at least one second physical quality value of the at least one physical quality, measured while capturing the real target sensor data by target sensor 130. The physical quality may be indicative of an amount of use of a sensor when capturing a signal. Some examples of a physical quality are a distance a vehicle traverses while capturing the signal, an amount of time for capturing the signal, an atmospheric pressure while capturing the signal, an environment temperature while capturing the signal, and an amount of light while capturing the signal. Optionally, the at least one first physical quality value comprises a first value of a first distance the plurality of sensors traversed in the common physical scene while capturing the plurality of real signals, and the at least one second physical quality value comprises a second distance value of a second distance target sensor 130 traversed in the other physical scene while capturing the real target sensor data. Optionally, the at least one first physical value is indicative of greater use of the plurality of sensors to capture the plurality of real signals than use of target sensor 130 to capture the real target sensor data. For example, a ratio between the first distance value and the second distance value may be greater than an identified ratio threshold. Optionally, the identified ratio threshold is 10, optionally indicating that a first distance traversed by the plurality of sensors while capturing the plurality of real signals is at least 10 times greater than a second distance traversed by target sensor 130 while capturing the real target sensor data. Optionally, the identified ratio threshold is 100. Optionally the identified ratio threshold is 1000.

Processor 101 optionally applies in 350 another style transformation to the plurality of synthetic training signals produced in 301 and to the real target sensor data to produce a plurality of transformed synthetic training signals, for example large synthetic target specific training dataset 215 and optionally uses the plurality of transformed synthetic training signals in 304 when training the machine learning model. Training the machine learning model in 304 optionally comprises a plurality of training iterations using the plurality of synthetic training signals and additionally or alternatively the plurality of transformed synthetic training signals. Optionally, training the machine learning model in 304 further comprises a plurality of self-supervised training iterations.

Figure 4:
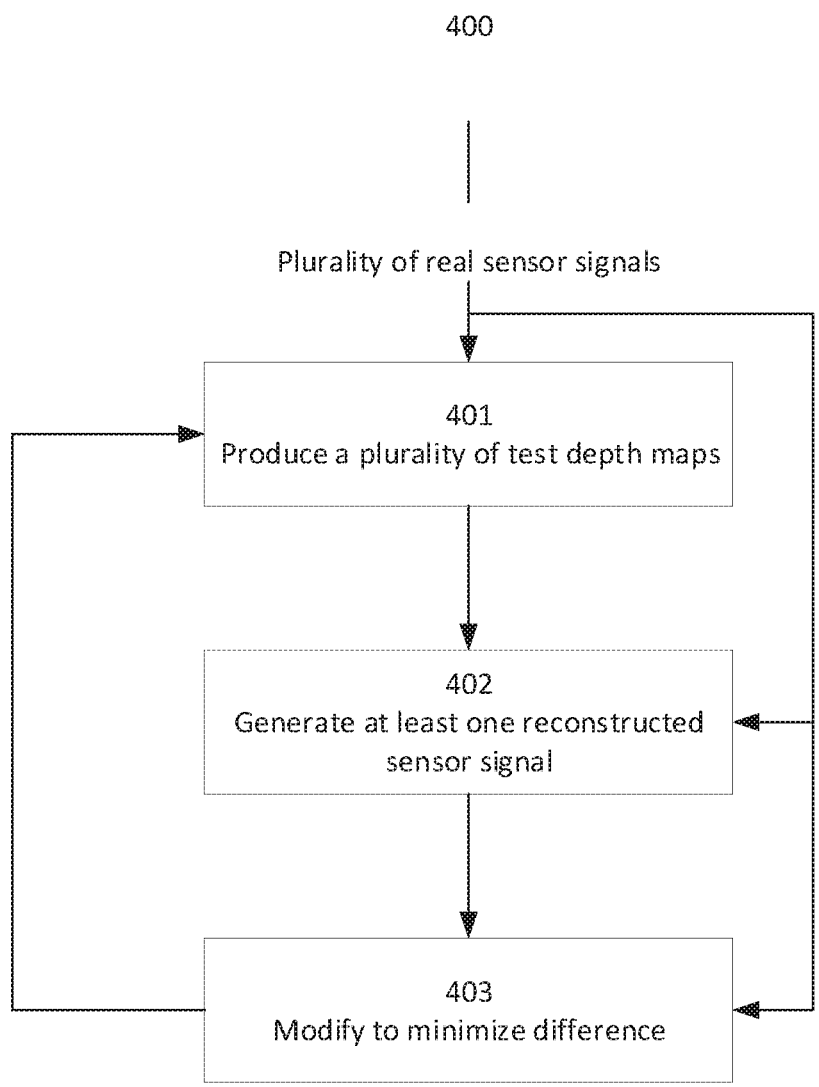
FIG. 4 is a schematic block diagram of an exemplary flow of operations for training a machine learning model, according to some embodiments of the present invention.

Reference is now made also to FIG. 4, showing a schematic block diagram of an exemplary flow of operations 400 for training a machine learning model, according to some embodiments of the present invention. In such embodiments, in each of a plurality of self-supervised training iterations, in 401 processor 101 uses the machine learning model to produce a plurality of test depth maps based on at least some of the plurality of real sensor signals. In 402, processor 101 optionally uses at least one of the plurality of real sensor signals and at least some of the plurality of test depth maps to generate at least one reconstructed sensor signal associated with at least one first sensor of the plurality of sensors, where the at least one of the plurality of real sensor signals is associated with a second sensor of the plurality of sensors. For example, processor 101 may use a first real sensor signal of the plurality of real sensor signals captured by sensor 120a (and thus associated with sensor 120a) and a test depth map associated with sensor 120a to generate a reconstructed sensor signal associated with sensor 120b. Optionally, in 403 processor 101 modifies at least one model value of the machine learning model to minimize a difference between the at least one reconstructed sensor signal and at least one other real sensor signal associated with the at least first one sensor. Continuing the last example, in 403 processor 101 may modify at least one model value of the machine learning model to minimize a difference between the reconstructed sensor signal associated with sensor 120b and a second real sensor signal of the plurality of real sensor signals captured by sensor 120b (and thus associated with sensor 120b).

In some embodiments of the present invention, system 100 may be used additionally to produce synthetic data for a new target sensor, for example target sensor 140.

Reference is now made again to FIG. 3. In 315, processor 101 optionally applies a new point of view transformation to the plurality of real signals and the plurality of computed depth maps to produce new synthetic data. The new synthetic data optionally simulates a new possible signal captured from the common physical scene by new target sensor 140 in a new identified position relative to the plurality of sensors. Optionally, processor 101 provides the new synthetic data to the at least one testing engine to an other autonomous system comprising new target sensor 140. Optionally, the other autonomous system is an ADAS comprising new target sensor 140. Optionally the other autonomous system is an autonomous driving system comprising new target sensor 140.

Optionally, the new synthetic data comprises a new plurality of digital images, for example when the plurality of sensors is a plurality of cameras. Optionally, in 365 processor 101 applies a new hole-filling algorithm to the new plurality of digital images of the new synthetic data, to produce new filled target synthetic data, simulating target data captured by new target sensor 140, and optionally uses the new filled target synthetic data as the new synthetic data, for example providing the new filled target synthetic data to the at least one testing engine. Optionally, processor 101 applies the new hole-filling algorithm by executing at least one new prediction engine to predict at least one new color of at least one new pixel of at least one of the new plurality of digital images of the new synthetic data. Optionally, the at least one new prediction engine is at least one new color prediction machine learning model.

Optionally, in 325 processor 101 applies a new geometric distortion transformation to the new synthetic data according to at least one new physical characteristic of new target sensor 140, to produce new adjusted target synthetic data simulating target data captured by new target sensor 140 and optionally uses the new adjusted target synthetic data as the new synthetic data, for example providing the new adjusted target synthetic data to the at least one testing engine. Optionally, the new geometric distortion transformation is one of: a fisheye transform, a barrel distortion transform, a pincushion distortion transform and a moustache distortion transform. Optionally, processor 101 uses the new filled target synthetic data produced in 365 as the new synthetic data in 325.

Optionally, processor 101 applies in 335 a new style transformation to the new synthetic data according to new real target sensor data captured by new target sensor 140 from a new other physical scene, to produce target synthetic data simulating new target data captured by new target sensor 140 and optionally uses the new target synthetic data as the new synthetic data, for example providing the new target synthetic data to the at least one testing engine. The other physical scene may be a new other geographical area. Optionally, processor 101 uses the new adjusted target synthetic data produced in 325 as the new synthetic data in 335. Optionally, processor 101 uses the filled target synthetic data produced in 365 as the synthetic data in 335.

Processor 101 optionally applies in 355 a new other style transformation to the plurality of synthetic training signals produced in 301 and to the new real target sensor data to produce a new plurality of transformed synthetic training signals, and optionally uses the new plurality of transformed synthetic training signals in 304 when training the machine learning model.

In some embodiments of the present invention, synthetic data created by system 100 implementing flow of operations 300 is used for testing an autonomous system.

Figure 5:
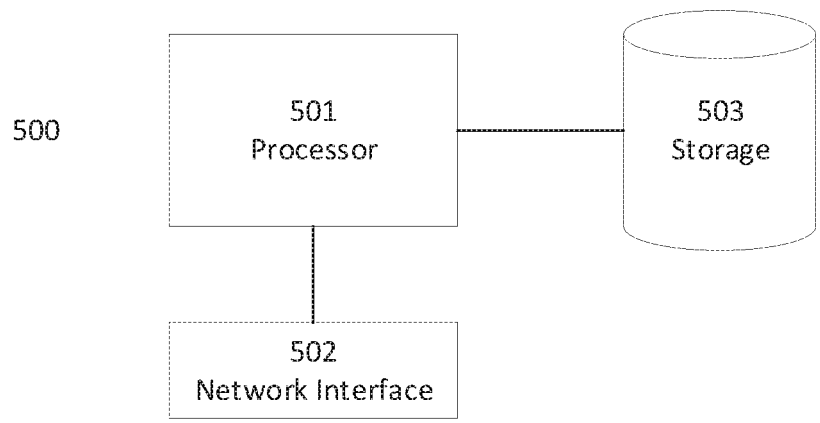
FIG. 5 is a schematic block diagram of an exemplary system for testing an autonomous system, according to some embodiments of the present invention.

Reference is now made also to FIG. 5, showing a schematic block diagram of an exemplary system 500 for testing an autonomous system, according to some embodiments of the present invention. In such embodiments, processor 501 is connected to at least one digital communication network interface 502, optionally for the purpose of receiving synthetic data. Optionally, at least one digital communication network interface 502 is connected to a local area network, for example an Ethernet network or a wireless network. Optionally, at least one digital communication network interface 502 is connected to a wide area network, for example the Internet. Optionally, at least one digital storage 502 is connected to processor 501. Optionally, processor 501 reads the synthetic data from at least one digital storage 503. Digital storage 503 is optionally one of: a hard disk drive, a network-connected storage, and a storage network.

To test the autonomous system, in some embodiments system 500 implements the following non-mandatory method.

Figure 6:
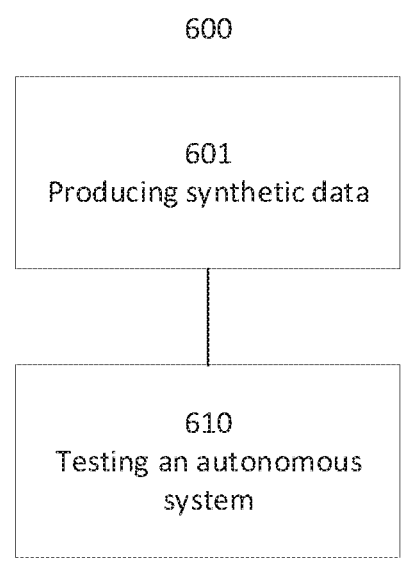
FIG. 6 is a flowchart schematically representing an optional flow of operations for testing an autonomous system, according to some embodiments of the present invention.

Reference is now made also to FIG. 6, showing a flowchart schematically representing an optional flow of operations 600 for testing an autonomous system comprising a target sensor, according to some embodiments of the present invention. In such embodiments, in 601 processor 501 optionally produces synthetic data simulating a possible signal captured from a common physical scene by the target sensor in an identified position relative to a plurality of sensors. Optionally, the synthetic data is produced using a plurality of real signals. Optionally, the plurality of real signals are captured simultaneously from the common physical scene by the plurality of sensors.

Optionally, system 600 implements method 300 to produce the synthetic data. Optionally, processor 501 produces a plurality of synthetic training signals, each simulating one of a plurality of signals simultaneously captured from a common training scene by the plurality of sensors, and a plurality of training depth maps each qualifying one of the plurality of synthetic training signals according to the common training scene. Optionally, processor 501 trains a machine learning model based on the plurality of synthetic training signals and the plurality of training depth maps. Optionally, processor 501 uses the machine learning model to compute a plurality of computed depth maps based on the plurality of real signals. Optionally, the plurality of real signals are captured simultaneously from the common physical scene. Optionally, each of the plurality of real signals are captured by one of the plurality of sensors. Optionally, each of the plurality of computed depth maps qualifies one of the plurality of real signals. Optionally, processor 501 applies a point of view transformation to the plurality of real signals and the plurality of computed depth maps, to produce synthetic data simulating the possible signal captured from the common physical scene by the target sensor in an identified position relative to the plurality of sensors.

Optionally, processor 501 receives the synthetic data from system 100, optionally via at least one digital communication network interface 502.

In 610, processor 501 optionally provides the synthetic data to at least one testing engine to test an autonomous system comprising a target sensor and optionally tests the autonomous system using the synthetic data. Optionally, the testing engine additionally or alternatively performs one or more operations on the autonomous system, where the one or more operations are selected from a group of: validating the autonomous system, verifying the autonomous system and training the autonomous system. Optionally the autonomous system is an ADAS. Optionally the autonomous system is an autonomous driving system.

In some embodiments of the present invention, the plurality of computed depth maps created by system 100 implementing flow of operations 300 is used for detecting one or more objects in the plurality of real signals.

Figure 7:
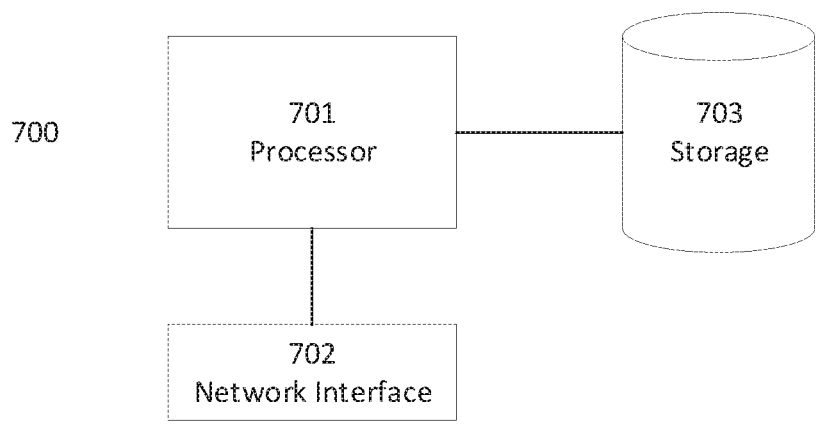
FIG. 7 is a schematic block diagram of an exemplary system for detecting an object, according to some embodiments of the present invention.

Reference is now made also to FIG. 7, showing a schematic block diagram of an exemplary system 700 for detecting an object, according to some embodiments of the present invention. In such embodiments, processor 701 is connected to at least one digital communication network interface 702, optionally for the purpose of receiving a plurality of real signals. Optionally, the plurality of real signals are captured by a plurality of sensors. Some examples of a sensor are an image sensor, such as a camera, an acceleration sensor, a velocity sensor, an audio sensor, a radar, a light detection and ranging (LIDAR) sensor, an ultrasonic sensor, a thermal sensor, and a far infra-red (FIR) sensor. A camera may capture visible light frequencies. A camera may capture invisible light frequencies such as infra-red light frequencies and ultra-violet light frequencies. Optionally, the plurality of real signals are stored in a database. Optionally processor 701 retrieves the plurality of real signals from the database.

Optionally, at least one digital communication network interface 702 is connected to a local area network, for example an Ethernet network or a wireless network. Optionally, at least one digital communication network interface 702 is connected to a wide area network, for example the Internet. Optionally, at least one digital storage 703 is connected to processor 701. Optionally, processor 701 reads the plurality of real signals from at least one digital storage 703, optionally from a database stored on at least one digital storage 703. Digital storage 703 is optionally one of: a hard disk drive, a network-connected storage, and a storage network.

To detect one or more objects in the plurality of real signals, in some embodiments system 700 implements the following non-mandatory method.

Figure 8:
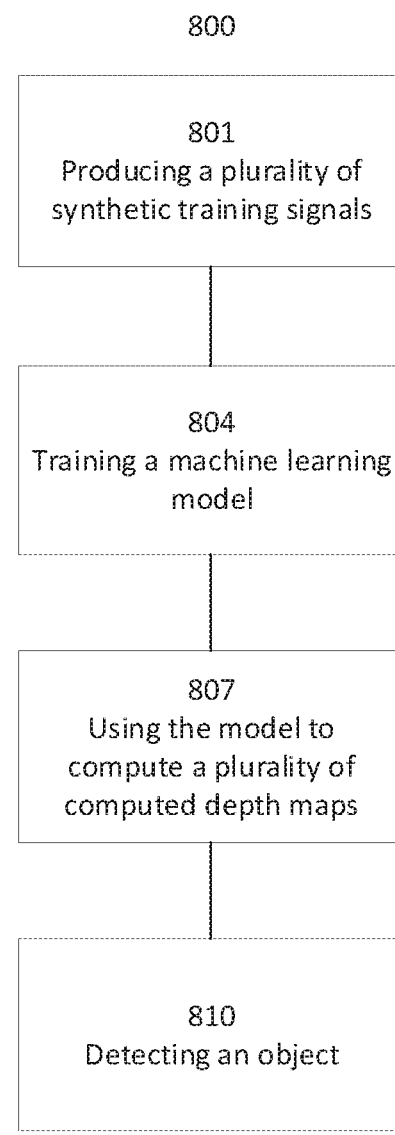
FIG. 8 is a flowchart schematically representing an optional flow of operations for detecting an object, according to some embodiments of the present invention.

Reference is now made also to FIG. 8, showing an optional flow of operations 800 for detecting one or more objects, according to some embodiments of the present invention. In such embodiments, processor 701 produces in 801 a plurality of synthetic training signals, such that each of the plurality of synthetic training signals simulates one of a plurality of signals simultaneously captured from a common training scene by a plurality of sensors. In addition, in such embodiments, processor 701 produces in 801 a plurality of training depth maps, each qualifying one of the plurality of synthetic training signals according to the common training scene. The common training scene may be a training geographical area. In 804, processor 701 optionally trains a machine learning model based on the plurality of synthetic training signals and the plurality of training depth maps. Optionally, the machine learning model is a neural network. In 807, processor 701 optionally uses the machine learning model to compute a plurality of computed depth maps based on a plurality of real signals. Optionally, the plurality of real signals are captured simultaneously from a common physical scene such that each of the plurality of real signals is captured by one of the plurality of sensors. The common physical scene may be a geographical area. Optionally, each of the plurality of real signals comprises a plurality of digital images captured from the common physical scene by respective sensor, for example when the respective sensor is a camera. Optionally, each of the plurality of depth maps qualifies one of the plurality of real signals. Optionally, each of the plurality of computed depth maps comprises a plurality of depth images, each comprising depth information for a digital image of respective plurality of digital images qualified by the computed depth map. Optionally, each depth map of the plurality of depth images comprises depth information for each of a plurality of pixels of respective digital image. In 810, processor 701 optionally provides the plurality of depth maps to at least one object classification engine to detect at least one object in the plurality of real signals.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant point of view transformations and style transformations will be developed and the scope of the terms "point of view transformation" and "style transformation" are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for creating synthetic data for testing an autonomous system, comprising:
    at least one hardware processor adapted to execute a code for:
        producing a plurality of synthetic training signals, each simulating one of a plurality of signals simultaneously captured from a common training scene by a plurality of sensors, and a plurality of training depth maps each qualifying one of the plurality of synthetic training signals according to the common training scene;
        training a machine learning model based on the plurality of synthetic training signals and the plurality of training depth maps;
        using the machine learning model to compute a plurality of computed depth maps based on a plurality of real signals, the plurality of real signals are captured simultaneously from a common physical scene, each of the plurality of real signals are captured by one of the plurality of sensors, each of the plurality of computed depth maps qualifies one of the plurality of real signals;
        applying a point of view transformation to the plurality of real signals and the plurality of computed depth maps, to produce synthetic data simulating a possible signal captured from the common physical scene by a target sensor in an identified position relative to the plurality of sensors; and
        providing the synthetic data to at least one testing engine to test an autonomous system comprising the target sensor.

2. The system of claim 1, wherein the at least one hardware processor is adapted to further execute code for:
    applying a style transformation to the synthetic data according to real target sensor data captured by the target sensor from an other physical scene, to produce target synthetic data simulating target data captured by the target sensor; and
    using the target synthetic data as the synthetic data.

3. The system of claim 1, wherein the at least one hardware processor is adapted to further execute code for:
    applying a geometric distortion transformation to the synthetic data according to at least one physical characteristic of the target sensor, to produce adjusted target synthetic data simulating target data captured by the target sensor; and
    using the adjusted target synthetic data as the synthetic data.

4. The system of claim 3, wherein the geometric distortion transformation is selected from a group of geometric distortion transformations comprising: a fisheye transform, a barrel distortion transform, a pincushion distortion transform, and a moustache distortion transform.

5. The system of claim 1, wherein the synthetic data comprises a plurality of synthetic digital images; and
    wherein the at least one hardware processor is adapted to further execute code for:

applying a hole-filling algorithm to the plurality of synthetic images of the synthetic data to produce filled target synthetic data simulating target data captured by the target sensor; and using the filled target synthetic data as the synthetic data.

6. The system of claim 1, wherein the plurality of sensors are a plurality of cameras;

wherein the target sensor is a target camera;

wherein each of the plurality of real signals comprises a plurality of digital images captured from the common physical scene by a respective camera of the plurality of cameras; and wherein each of the plurality of computed depth maps comprises a plurality of depth images, each comprising depth information for a digital image of a respective plurality of digital images qualified by the computed depth map.

7. The system of claim 6, wherein each depth image of the plurality of depth images comprises depth information for each of a plurality of pixels of a respective digital image.

8. The system of claim 1, wherein the machine learning model is a neural network.

9. The system of claim 1, wherein at least one first physical quality value of at least one physical quality, measured while capturing the plurality of real signals by the plurality of sensors, is greater than at least one second physical quality value of the at least one physical quality, measured while capturing the real target sensor data by the target sensor.

10. The system of claim 9, wherein the at least one first physical quality value comprises a first value of a first distance the plurality of sensors traversed in the common physical scene while capturing the plurality of real signals; and wherein the at least one second physical quality value comprises a second distance value of a second distance the target sensor traversed in the other physical scene while capturing the real target sensor data.

11. The system of claim 10, wherein a ratio between the first distance value and the second distance value is greater than an identified ratio threshold.

12. The system of claim 11, wherein the identified ratio threshold is selected from a group of ratio thresholds comprising 10, 100 and 1000.

13. The system of claim 1, wherein the plurality of real signals are captured while the plurality of sensors are mounted on a vehicle in an identified pattern;

wherein the real target sensor data is captured while the target sensor is mounted on the vehicle at the identified position; and wherein the identified position is an identified relative position relative to the identified pattern.

14. The system of claim 13, wherein the identified pattern is a grid.

15. The system of claim 1, wherein the at least one hardware processor is adapted to further execute code for:

applying another style transformation to the plurality of synthetic training signals and to the real target sensor data to produce a plurality of transformed synthetic training signals; and using the plurality of transformed synthetic training signals when training the machine learning model.

16. The system of claim 1, wherein training the machine learning model comprises:

in each of a plurality of self-supervised training iterations:

using the machine learning model to produce a plurality of test depth maps based on at least some of the plurality of real sensor signals;

using at least one of the plurality of real sensor signals and at least some of the plurality of test depth maps to generate at least one reconstructed sensor signal associated with at least one first sensor of the plurality of sensors, where the at least one of the plurality of real sensor signals is associated with a second sensor of the plurality of sensors; and modifying at least one model value of the machine learning model to minimize a difference between the at least one reconstructed sensor signal and at least one other real sensor signal associated with the at least one first sensor.

17. The system of claim 1, wherein the at least one hardware processor is adapted to further execute code for:

applying a new point of view transformation to the plurality of real signals and the plurality of computed depth maps, to produce new synthetic data simulating a new possible signal captured from the common physical scene by a new target sensor in a new identified position relative to the plurality of sensors; and providing the new synthetic data to the at least one testing engine to test an other autonomous system comprising the new target sensor.

18. The system of claim 17, wherein the at least one hardware processor is adapted to further execute code for:

applying a new style transformation to the new synthetic data according to new real target sensor data captured by the new target sensor from a new other physical scene, to produce new target synthetic data simulating new target data captured by the new target sensor; and using the new target synthetic data as the new synthetic data.

19. The system of claim 17, wherein the at least one hardware processor is adapted to further execute code for:

applying a geometric distortion transformation to the new synthetic data according to at least one new physical characteristic of the new target sensor, to produce new adjusted target synthetic data simulating new target data captured by the new target sensor; and using the new adjusted target synthetic data as the new synthetic data.

20. The system of claim 19, wherein the geometric distortion transformation is selected from a group of geometric distortion transformations.

21. The system of claim 17, wherein the new synthetic data comprises a new plurality of synthetic digital images; and wherein the at least one hardware processor is adapted to further execute code for:

applying a new hole-filling algorithm to the new plurality of synthetic images of the new synthetic data to produce new filled target synthetic data simulating new target data captured by the new target sensor; and using the new filled target synthetic data as the new synthetic data.

22. The system of claim 17, wherein the at least one hardware processor is adapted to further execute code for:

applying a new other style transformation to the plurality of synthetic training signals and to the new real target sensor data to produce a new plurality of transformed synthetic training signals; and using the new plurality of transformed synthetic training signals when training the machine learning model.

23. The system of claim 1, wherein the autonomous system comprising the target sensor is selected from a group of autonomous systems consisting of: an autonomous driving system, and an advanced driver-assistance system (ADAS).

24. A method for creating synthetic data for testing an autonomous system, comprising:
producing a plurality of synthetic training signals, each simulating one of a plurality of signals simultaneously captured from a common training scene by a plurality of sensors, and a plurality of training depth maps each qualifying one of the plurality of synthetic training signals according to the common training scene;
training a machine learning model based on the plurality of synthetic training signals and the plurality of training depth maps;
using the machine learning model to compute a plurality of computed depth maps based on a plurality of real signals, the plurality of real signals are captured simultaneously from a common physical scene, each of the plurality of real signals are captured by one of the plurality of sensors, each of the plurality of computed depth maps qualifies one of the plurality of real signals;
applying a point of view transformation to the plurality of real signals and the plurality of computed depth maps, to produce synthetic data simulating a possible signal captured from the common physical scene by a target sensor in an identified position relative to the plurality of sensors; and
providing the synthetic data to at least one testing engine to test an autonomous system comprising the target sensor.

25. A system for testing an autonomous system, comprising a target sensor, comprising:
at least one hardware processor adapted to execute a code for:
producing synthetic data simulating a possible signal captured from a common physical scene by the target sensor in an identified position relative to a plurality of sensors, where the synthetic data is produced using a plurality of real signals, the plurality of real signals are captured simultaneously from the common physical scene by the plurality of sensors; and
testing the autonomous system using the synthetic data;
wherein producing the synthetic data using the plurality of real signals comprises:
producing a plurality of synthetic training signals, each simulating one of a plurality of signals simultaneously captured from a common training scene by the plurality of sensors, and a plurality of training depth maps each qualifying one of the plurality of synthetic training signals according to the common training scene;
training a machine learning model based on the plurality of synthetic training signals and the plurality of training depth maps;
using the machine learning model to compute a plurality of computed depth maps based on the plurality of real signals, the plurality of real signals are captured simultaneously from the common physical scene, each of the plurality of real signals are captured by one of the plurality of sensors, each of the plurality of computed depth maps qualifies one of the plurality of real signals;
applying a point of view transformation to the plurality of real signals and the plurality of computed depth maps, to produce synthetic data simulating the possible signal captured from the common physical scene by the target sensor in an identified position relative to the plurality of sensors; and
providing the synthetic data to at least one testing engine to test the autonomous system.

26. A system for detecting a plurality of objects in sensor data, comprising:
at least one hardware processor adapted to execute a code for:
producing a plurality of synthetic training signals, each simulating one of a plurality of signals simultaneously captured from a common training scene by a plurality of sensors, and a plurality of training depth maps each qualifying one of the plurality of synthetic training signals according to the common training scene;
training a machine learning model based on the plurality of synthetic training signals and the plurality of training depth maps;
using the machine learning model to compute a plurality of computed depth maps based on a plurality of real signals, the plurality of real signals are captured simultaneously from a common physical scene, each of the plurality of real signals are captured by one of the plurality of sensors, each of the plurality of computed depth maps qualifies one of the plurality of real signals;
and
providing the plurality of computed depth maps to at least one object classification engine to detect at least one object in the plurality of real signals.

* * * * *